(12) United States Patent
Nakano et al.

(10) Patent No.: US 8,485,742 B2
(45) Date of Patent: Jul. 16, 2013

(54) FOCAL PLANE SHUTTER AND OPTICAL APPARATUS

(75) Inventors: Yoichi Nakano, Chiba (JP); Makoto Mikami, Chiba (JP); Chiaki Nemoto, Chiba (JP)

(73) Assignee: Seiko Precision Inc., Narashino-Shi (JP)

( * ) Notice: Subject to any disclaimer, the term of this patent is extended or adjusted under 35 U.S.C. 154(b) by 0 days.

(21) Appl. No.: 13/291,215

(22) Filed: Nov. 8, 2011

(65) Prior Publication Data
US 2012/0134660 A1 May 31, 2012

(30) Foreign Application Priority Data

Nov. 29, 2010 (JP) ................. 2010-265797

(51) Int. Cl.
*G03B 9/08* (2006.01)
*G03B 9/32* (2006.01)

(52) U.S. Cl.
USPC ............ 396/468; 396/455; 396/456; 396/480

(58) Field of Classification Search
USPC ................ 396/468, 452, 463–467, 469–470, 396/471, 477, 479, 480, 455, 456
See application file for complete search history.

(56) References Cited

U.S. PATENT DOCUMENTS
2004/0223756 A1* 11/2004 Nakano et al. ................ 396/489
2010/0158504 A1 6/2010 Moriyama FOREIGN PATENT DOCUMENTS
| JP | 56-78313 | 6/1981 |
| JP | 3-49203 | 3/1991 |
| JP | 2000-49011 | 2/2000 |
| JP | 2002-086298 | 3/2002 |
| JP | 2007-240783 | 9/2007 |
| JP | 2010-152000 A1 | 7/2010 |

OTHER PUBLICATIONS

Notification of Reason(s) for Refusal mailed Jan. 15, 2013 by the Japanese Patent Office in counterpart application No. 2010-265797 with English translation.

* cited by examiner

*Primary Examiner* — Rochelle-Ann J Blackman
(74) *Attorney, Agent, or Firm* — Kratz, Quintos & Hanson, LLP

(57) ABSTRACT

A focal plane shutter includes: a board including an opening; blades capable of opening and closing the opening; a drive lever swingably supported, holding a movable iron piece and driving the blades; a self-holding type solenoid capable of adsorbing to the movable iron piece by a given attraction force in a non-energized state, and reducing the given attraction force in an energized state; a biasing member biasing the drive lever to move the drive lever away from the self-holding type solenoid; and a set member moving the drive lever to abut the drive lever with the self-holding type solenoid, wherein the self-holding type solenoid is energized to reduce the given attraction force when the drive lever is swung by the set member to abut the movable iron piece with the self-holding type solenoid.

6 Claims, 13 Drawing Sheets

FOCAL PLANE SHUTTER AND OPTICAL APPARATUS

CROSS-REFERENCE TO RELATED APPLICATION

This application is based upon and claims priority to Japanese Patent Application No. 2010-265797 filed on Nov. 29, 2010, subject matter of these patent documents is incorporated by reference herein in its entirety.

BACKGROUND (i) Technical Field

The present invention relates to focal plane shutters and optical apparatuses.

(ii) Related Art

There is known a focal plane shutter using a self-holding type solenoid for driving blades. In addition to the self-holding type solenoid, such a focal plane shutter is equipped with a drive lever, a biasing member, and a set member. The drive lever holds a movable iron piece and drives the blades. The self-holding type solenoid is capable of adsorbing to the movable iron piece by a given attraction force in a non-energized state, and reduces the attraction force in an energized state. The biasing member is provided for biasing the drive lever such that the movable iron piece moves away from the self-holding type solenoid. The set member drives the drive lever to abut the movable iron piece with the self-holding type solenoid. Japanese Patent Unexamined Application Publication No. 2010-152000 discloses the focal plane shutter employing the self-holding type solenoid.

The set member drives the movable iron piece to abut the movable iron piece with the self-holding type solenoid in the non-energized state. After that, the set member recedes from the drive lever. A wait state where the self-holding type solenoid is adsorbed to the movable iron piece is maintained. After a given period elapses from when a release button is pushed, the self-holding type solenoid is energized. This reduces the attraction force of the self-holding type solenoid, whereby the drive lever recedes from the self-holding type solenoid in accordance with the biasing force of the biasing member. This drives the blades. Subsequently, the set member moves the drive lever, and a wait state where the self-holding type solenoid is adsorbed to the movable iron piece is maintained again.

Herein, a state where the self-holding type solenoid is adsorbed to the movable iron piece may be maintained for a long period, while a portion where the movable iron piece of the drive lever and a yoke of the self-holding type solenoid abut each other is attached with a lubricant oil applied in producing the focal plane shutter and impure substances such as dusts or metal powders by generated in driving the focal plane shutter. This tends to fix the movable iron piece of the drive lever and the yoke of the self-holding type solenoid. This may result in variations in the period from when energization of the self-holding type solenoid starts to when the drive lever recedes from the self-holding type solenoid after the release button is pushed again. This may result in variations in the timing of driving the blades.

SUMMARY

It is therefore an object to provide a focal plane shutter and an optical apparatus having the same suppressing a variation in the timing of driving blades.

According to an aspect of the present invention, there is provided a focal plane shutter including: a board including an opening; blades capable of opening and closing the opening; a drive lever swingably supported, holding a movable iron piece and driving the blades; a self-holding type solenoid capable of adsorbing to the movable iron piece by a given attraction force in a non-energized state, and reducing the given attraction force in an energized state; a biasing member biasing the drive lever to move the drive lever away from the self-holding type solenoid; and a set member moving the drive lever to abut the drive lever with the self-holding type solenoid, wherein the self-holding type solenoid is energized to reduce the given attraction force when the drive lever is swung by the set member to abut the movable iron piece with the self-holding type solenoid.

DETAILED DESCRIPTION

In the following, the present embodiment according to the present invention will be described with reference to the drawings.

Figure 1:
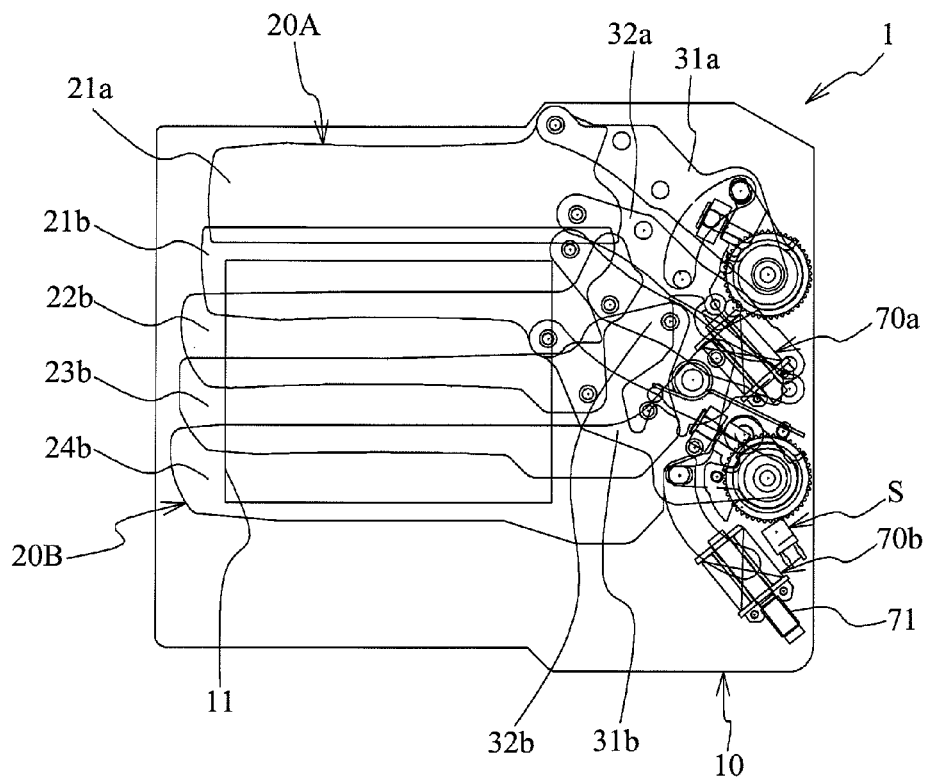
FIG. 1 is a front view of a focal plane shutter according to a present embodiment.
Figure 2:
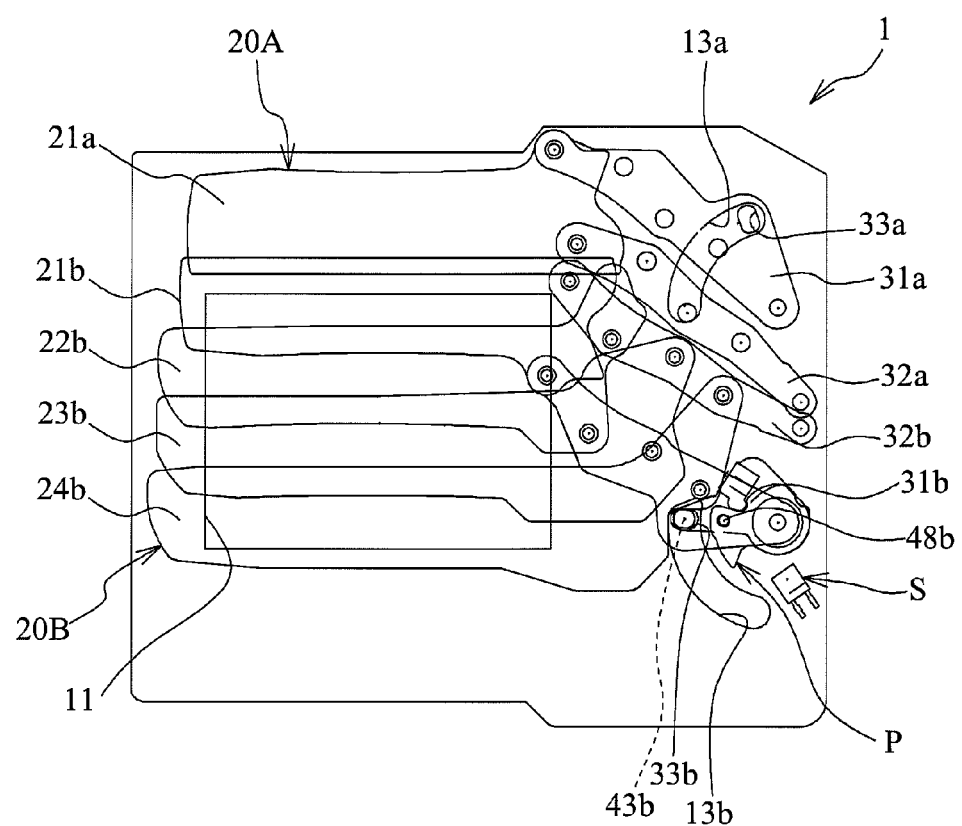
FIG. 2 is a front view of a part of the focal plane shutter.
Figure 3:
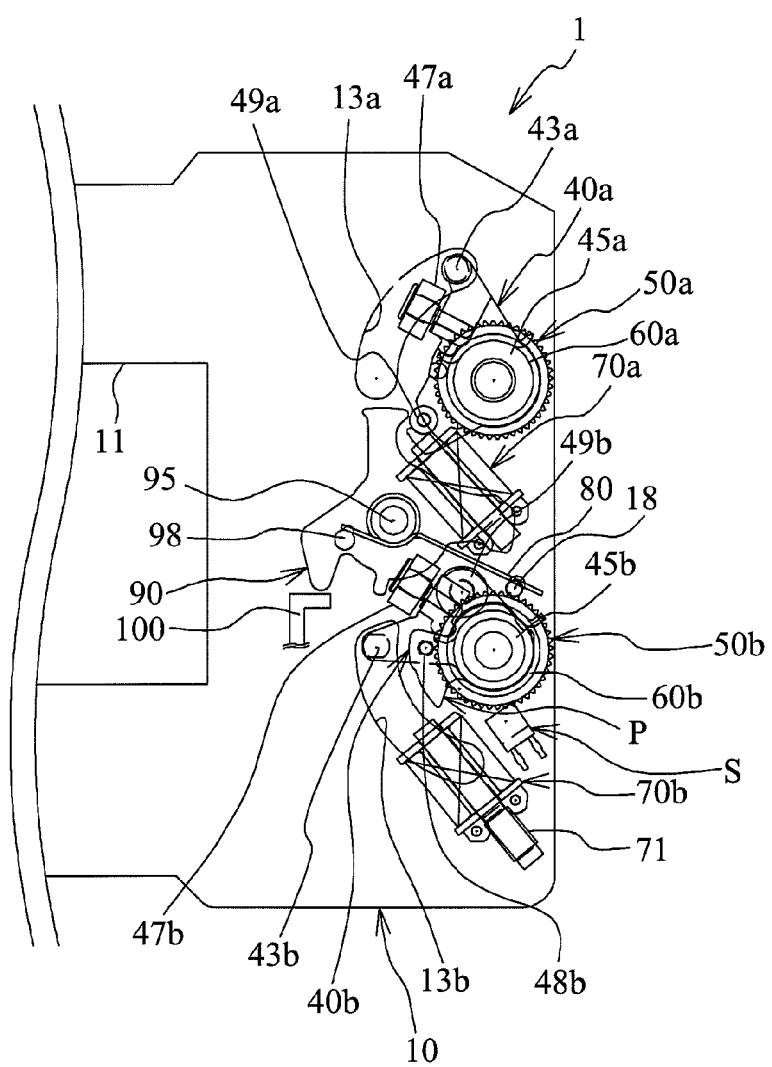
FIG. 3 is a front view of a part of the focal plane shutter.

FIG. 1 is a front view of a focal plane shutter according to the present embodiment. FIGS. 2 and 3 are front views of a part of the focal plane shutter. Additionally, reference numerals are given to some of the parts in FIGS. 1 to 3.

As illustrated in FIG. 1, the focal plane shutter 1 includes a board 10, blades 21a, 21b to 24b, arms 31a, 32a, 31b, and 32b, an electromagnet 70a, and a self-holding type solenoid 70b. The board 10 is formed of a resin. The board 10 is provided with a rectangular opening 11.

Trailing blades 20B includes four blades 21b to 24b. Also, reading blades 20A includes four blades. However, only one blade 21a is illustrated in FIGS. 1 and 2. FIGS. 1 to 3 illustrate the reading blades 20A in an overlapped state and the trailing blades 20B in an expanded state. In FIGS. 1 to 3, the reading blades 20A recede from the opening 11 and the trailing blades 20B close the opening 11.

As illustrated in FIG. 2, the reading blades 20A are connected to the arms 31a and 32a. The trailing blades 20B are connected to the arms 31b and 32b. Each of the arms 31a, 32a, 31b, and 32b is swingably supported by the board 10. The arms 31a and 31b are respectively provided with fitting holes 33a and 33b.

As illustrated in FIG. 3, the board 10 is provided with a leading-blades drive lever 40a and a trailing-blades drive lever 40b that drive the arms 31a and 31b, respectively. The leading-blades drive lever 40a and the trailing-blades drive lever 40b are respectively provided with spindles 45a and 45b. The spindles 45a and 45b are rotatably supported by the board 10. Thus, each of the leading-blades drive lever 40a and the trailing-blades drive lever 40b is swingably supported in a given range by the board 10. The leading-blades drive lever 40a and the trailing-blades drive lever 40b are respectively provided with drive pins 43a and 43b. The board 10 is provided with escape holes 13a and 13b that escape the movements of the drive pins 43a and 43b, respectively. Each of the escape holes 13a and 13b has an arc shape. The drive pins 43a and 43b are respectively fitted into the fitting hole 33a of the arm 31a and the fitting hole 33b of the arm 31b. Swinging the leading-blades drive lever 40a causes the arm 31a to swing and to move the reading blades 20A. Likewise, swinging the trailing-blades drive lever 40b causes the arm 31b to swing and to move the trailing blades 20B.

The leading-blades drive lever 40a and the trailing-blades drive lever 40b respectively include movable iron pieces 47a and 47b. The leading-blades drive lever 40a is swingable from a position where the movable iron piece 47a abuts the electromagnet 70a to a position where the movable iron piece 47a recedes from the electromagnet 70a. The configuration of the trailing-blades drive lever 40b is the same. The spindles 45a and 45b are respectively fitted with the bias springs 60a and 60b each having a coil shape. The bias spring 60a biases the leading-blades drive lever 40a in such a direction that the movable iron piece 47a moves away from the electromagnet 70a. Likewise, the bias spring 60b biases the trailing-blades drive lever 40b in such a direction that the movable iron piece 47b moves away from the self-holding type solenoid 70b.

The spindles 45a and 45b respectively engage ratchet gears 50a and 50b. The ratchet gear 50a engages one end of the bias spring 60a. The other end of the bias spring 60a engages the leading-blades drive lever 40a. The rotational degree of the ratchet gear 50a is adjusted, so that the biasing force of the bias spring 60a can be adjusted. The ratchet gear 50b has the same function of the ratchet gear 50a.

When being energized, the electromagnet 70a is capable of adsorbing to the movable iron piece 47a. The electromagnet 70a includes: a yoke; a coil bobbin attached to the yoke; and a coil wounded around the coil bobbin. The energization of the coil excites the yoke, and then the magnetic attraction force is generated between the yoke and the movable iron piece 47a.

The self-holding type solenoid 70b is capable of adsorbing to the movable iron piece 47b by a given attraction force in a non-energized state, and reduces the attraction force in an energized state. The self-holding type solenoid 70b includes: a yoke; a coil bobbin attached to the yoke; a coil wounded around the coil bobbin; and a permanent magnet 71 secured to the yoke. Since the permanent magnet 71 is provided in the yoke, the yoke also functions as a magnet. Therefore, the self-holding type solenoid 70b is capable of adsorbing to the movable iron piece 47b in the non-energized state.

Further, the coil is energized to cancel a polarity generated in the yoke by the permanent magnet 71, thereby reducing the magnetic attraction force effecting between the yoke and the movable iron piece 47b. Thus, the coil is energized to cancel the polarity generated in the yoke by the permanent magnet 71 while the movable iron piece 47b is abutting the yoke of the self-holding type solenoid 70b, thereby reducing the magnetic attraction force between the yoke and the movable iron piece 47b. Therefore, the trailing-blades drive lever 40b is swung by the biasing force of the bias spring 60b. In such a way, the movable iron piece 47b moves away from the self-holding type solenoid 70b after being adsorbed thereto.

A set member 90 is provided for positioning the leading-blades drive lever 40a and the trailing-blades drive lever 40b at desirable positions. The set member 90 has a spindle portion 95 rotatably supported by the board 10. The set member 90 is attached with a returning spring 80 for returning the set member 90 to an initial position. The returning spring 80 is fitted onto the spindle portion 95. One end of the returning spring 80 abuts a projection portion 18 formed in the board 10. The other end of the returning spring 80 abuts a projection portion 98 formed in the set member 90. The returning spring 80 biases the set member 90 counterclockwise.

A thin plate P is arranged coaxially with the trailing-blades drive lever 40b. The thin plate P has a thin plate shape. An engagement pin 48b is formed in the trailing-blades drive lever 40b and fitted into the thin plate P. Therefore, the thin plate P and the trailing-blades drive lever 40b swing together. Further, a sensor S is arranged near the trailing-blades drive lever 40b. The sensor S is a sensor capable of detecting a position of the thin plate P. The sensor S detects the position of the thin plate P to detect a position of the trailing blades 20B.

Figure 4A:
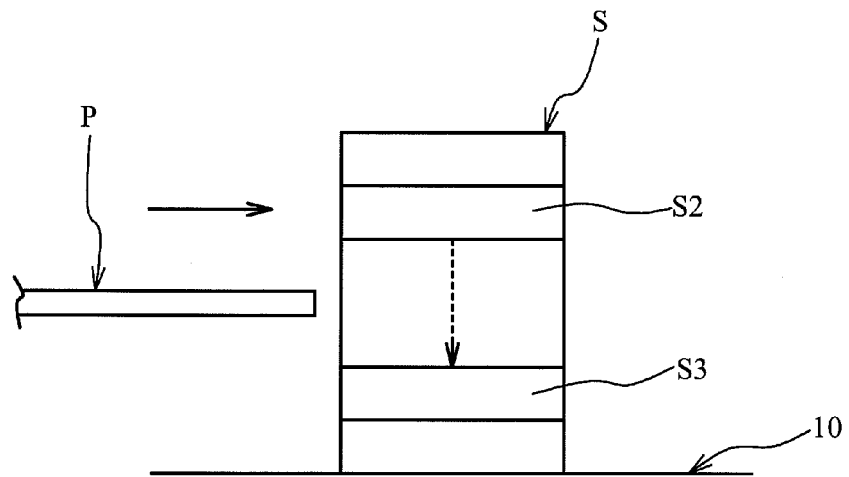
FIGS. 4A and 4B are explanatory views of a sensor.
Figure 4B:
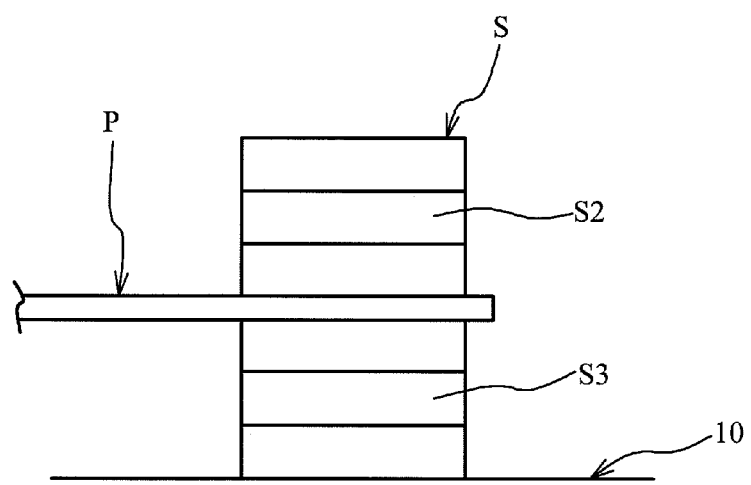

FIGS. 4A and 4B are explanatory views of the sensor S. The sensor S is arranged on the board 10. The sensor S has a light emitting element S2 and a light receiving element S3 that are arranged to face each other. The light receiving element S3 receives the light emitted from the light emitting element S2. As illustrated in FIGS. 4A and 4B, the thin plate P moves to be positioned between the light emitting element S2 and the light receiving element S3 in response to the swinging of the trailing-blades drive lever 40b. When being positioned between the light emitting element S2 and the light receiving element S3, the thin plate P interrupts the light emitted from the light emitting element S2. At this time, whether or not the thin plate P is positioned between the light emitting element S2 and the light receiving element S3 can be detected based on output signals from the light receiving element S3, thereby detecting the position of the trailing-blades drive lever 40b. This can result in detecting the position of the trailing blades 20B.

Additionally, the sensor S is not limited to the above configuration. For example, the sensor S may include: a light emitting element; a mirror reflecting the light emitted from the light emitting element; and a light receiving element receiving the light reflected by the mirror. The thin plate P is positioned between the light emitting element and the mirror, or between the light receiving element and the mirror, thereby detecting the position of the thin plate P.

Figure 5:
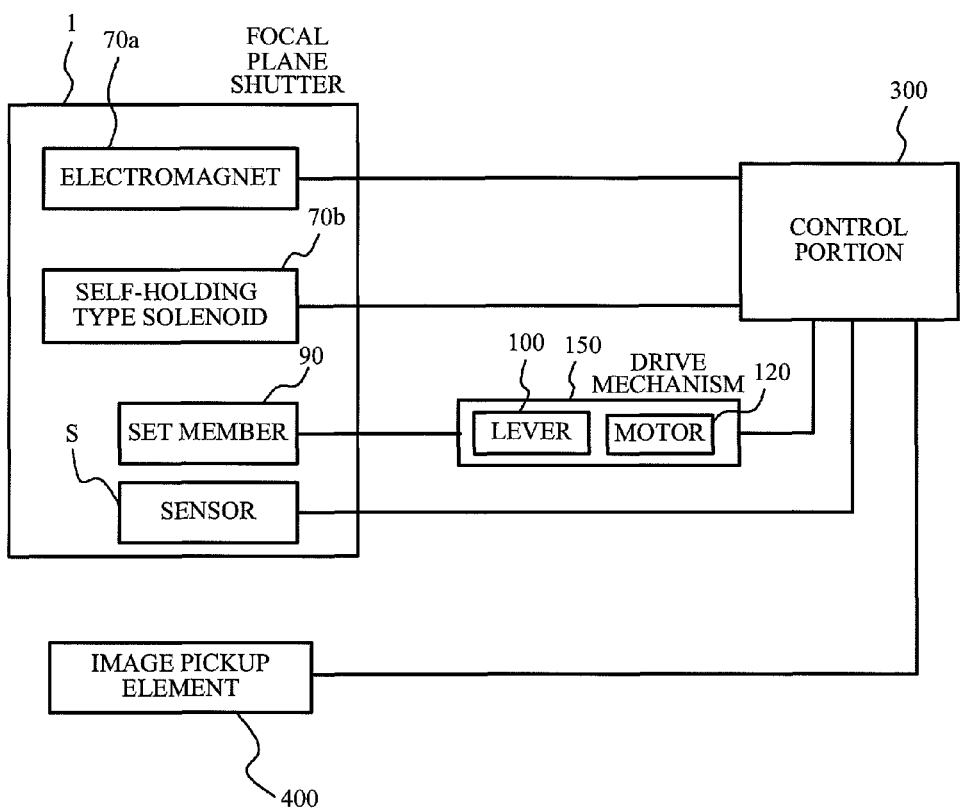
FIG. 5 is a block view of a camera equipped with the focal plane shutter.

A description will be given of a configuration of a camera equipped with the focal plane shutter 1. FIG. 5 is a block view of the camera equipped with the focal plane shutter 1. The camera includes: the focal plane shutter 1; a drive mechanism 150; a control portion 300; and an image pickup element 400. The control portion 300 controls an operation of the whole camera and includes a CPU, a ROM, and a RAM. Additionally, the camera includes lenses, not illustrated, for adjusting a focal length.

The control portion 300 controls energization states of the coils of the electromagnet 70a and the self-holding type solenoid 70b. The image pickup element 400 changes an object image into electric signals. The image pickup element 400 is, for example, a CCD or a CMOS. The drive mechanism 150 drives the set member 90 in response to the instruction from the control portion 300. The control portion 300 controls the energization of the coil of the self-holding type solenoid 70b in response to output signals from the sensor S, as will be described later.

The drive mechanism 150 includes: a lever 100 driving the set member 90; and a motor 120 capable of linearly reciprocating the lever 100 by a known technique, and rotatable in forward and reverse directions. The motor 120 is a stepping motor, and drives the lever 100 via gears not illustrated. The control portion 300 controls the driving of the motor 120 to control the lever 100. This controls the rotation of the set member 90. The control portion 300 controls the rotational speed of the motor 120 to control the driving speed of the lever 100. This controls the rotational speed of the set member 90.

Figure 6:
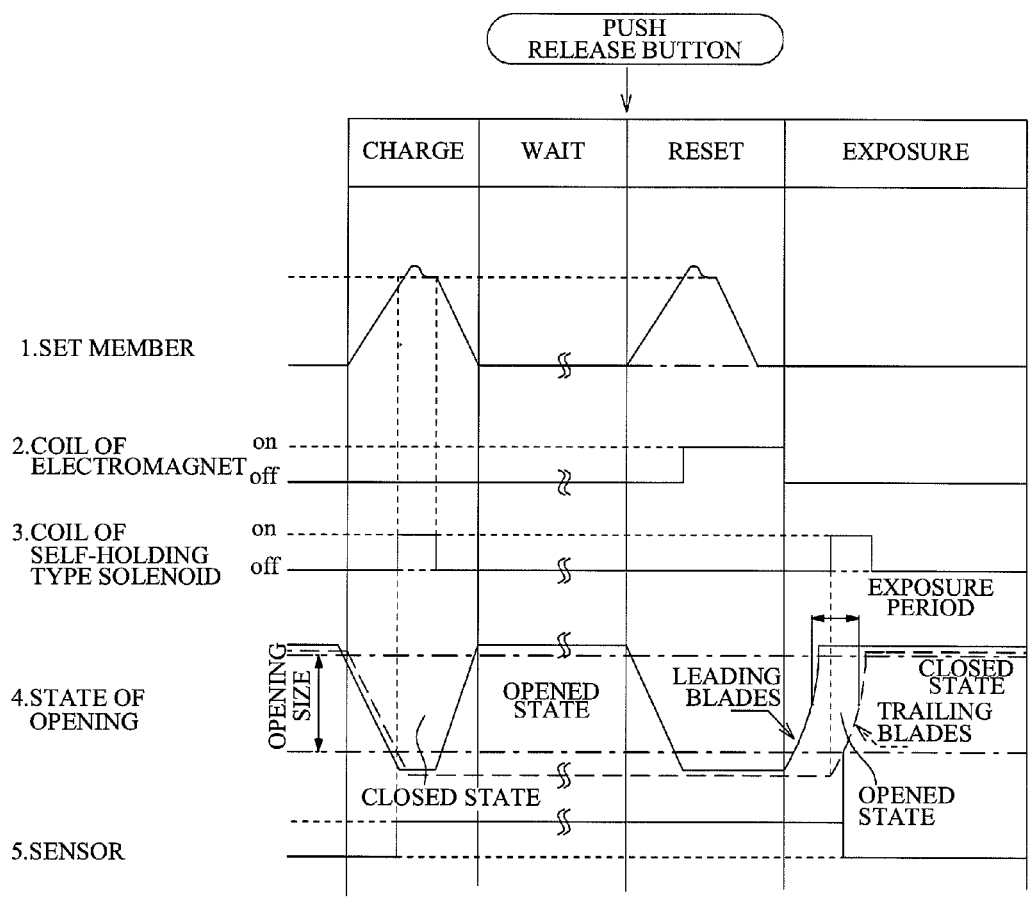
FIG. 6 is a timing chart of the focal plane shutter.

Next, an operation of the focal plane shutter 1 will be described. FIG. 6 is a timing chart of the focal plane shutter 1. FIGS. 7 to 13 are explanatory views of the operation of the focal plane shutter 1. Additionally, some parts are omitted in FIGS. 7 to 13. FIGS. 1 to 3 illustrate a state just after an exposure operation is finished.

The lever 100 illustrated in FIG. 3 is driven from the exposure operation finished state illustrated in FIGS. 1 to 3, and then the set member 90 is rotated clockwise against the biasing force of the returning spring 80. Therefore, the set member 90 abuts a roller 49a of the leading-blades drive lever 40a and a roller 49b of the trailing-blades drive lever 40b to swing the leading-blades drive lever 40a and the trailing-blades drive lever 40b counterclockwise. Thus, the leading blades 20A expand and move to close the opening 11. The trailing blades 20B move to recede from the opening 11. The trailing-blades drive lever 40b swings counterclockwise, and then the thin plate P also swings counterclockwise.

Figure 7:
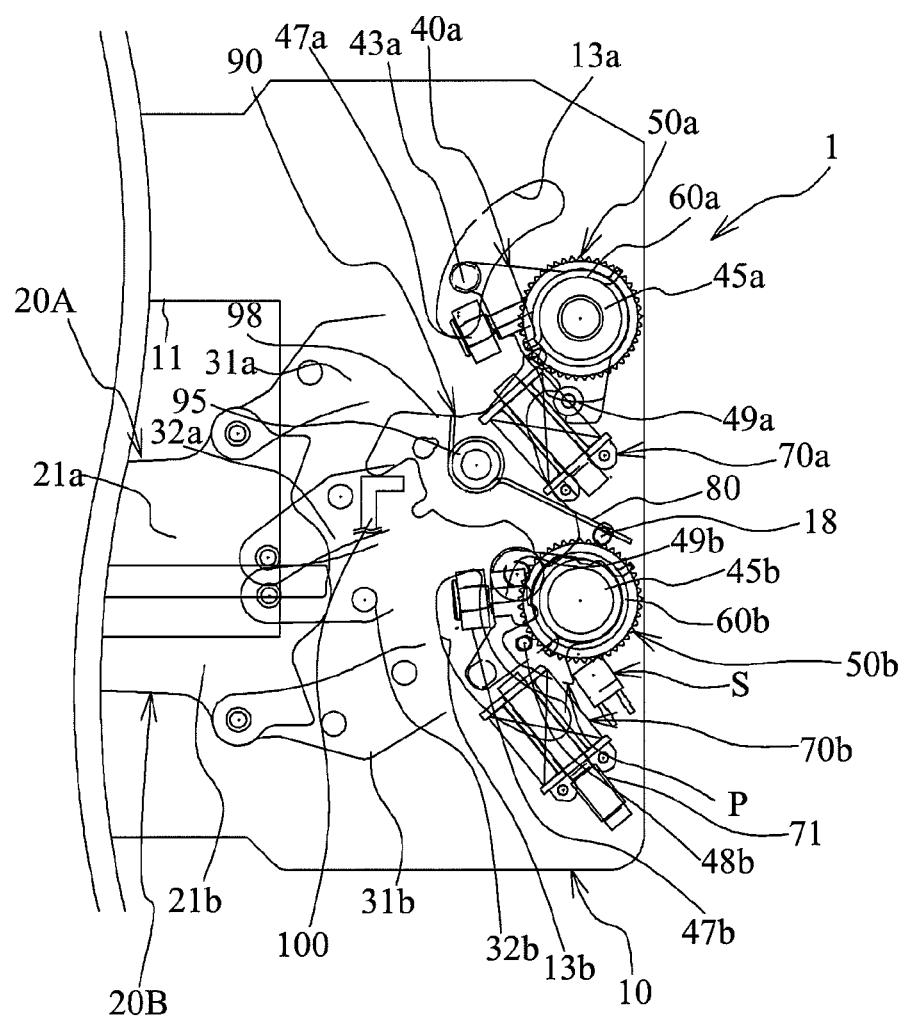
FIG. 7 is an explanatory view of an operation of the focal plane shutter.

The swinging of the thin plate P counterclockwise allows the sensor S to detect the thin plate P. FIG. 7 illustrates the focal plane shutter 1 in a state where the sensor S starts detecting the thin plate P. Before the trailing blades 20B fully recede from the opening 11 and before the movable iron piece 47b abuts the self-holding type solenoid 70b, the sensor S detects the thin plate P. Referring to FIG. 7, the blade 21b partially covers the opening 11 when the sensor S detects the thin plate P. When the sensor S detects the thin plate P, the control portion 300 energizes the coil of the self-holding type solenoid 70b to cancel the polarities generated in the yoke by the permanent magnet 71. As mentioned above, the control portion 300 energizes the coil of the self-holding type solenoid 70b in response to the output from the sensor S.

Figure 8:
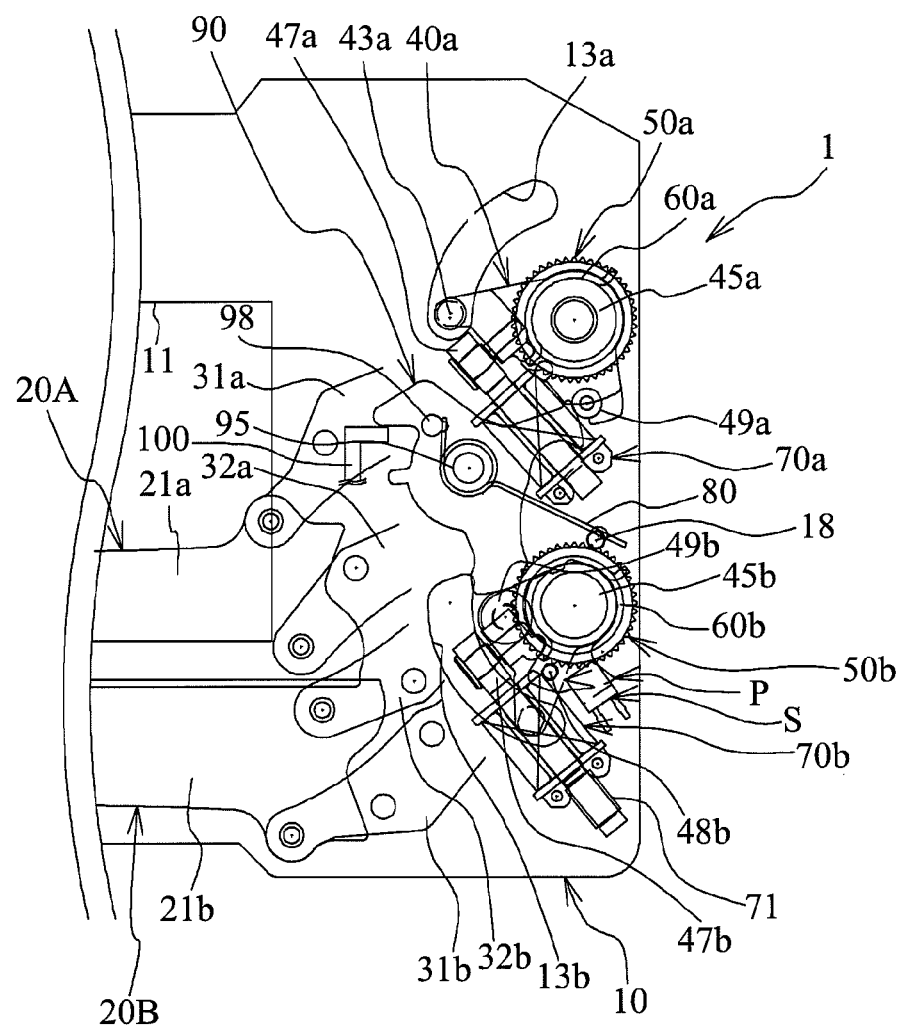
FIG. 8 is an explanatory view of the operation of the focal plane shutter.

Further, when the set member 90 rotates clockwise, the leading-blades drive lever 40a and the trailing-blades drive lever 40b further swing counterclockwise. As illustrated in FIG. 8, the leading blades 20A close the opening 11, and the trailing blades 20B recede from the opening 11. In this state, the movable iron pieces 47a and 47b abut the electromagnet 70a and the self-holding type solenoid 70b, respectively.

When the movable iron piece 47b abuts the self-holding type solenoid 70b, the above mentioned state where the coil of the self-holding type solenoid 70b is energized to cancel the polarities generated in the yoke by the permanent magnet 71 is maintained. Further, the energization of the coil of the self-holding type solenoid 70b is stopped before the set member 90 recedes from the trailing-blades drive lever 40b as will be described later. The energization of the coil of the self-holding type solenoid 70b can reduce the magnetic attraction force that effecting on the movable iron piece 47b when the movable iron piece 47b abuts the self-holding type solenoid 70b. A reason to reduce the attraction force of the self-holding type solenoid 70b when the movable iron piece 47b abuts the self-holding type solenoid 70b will be described later.

Figure 9:
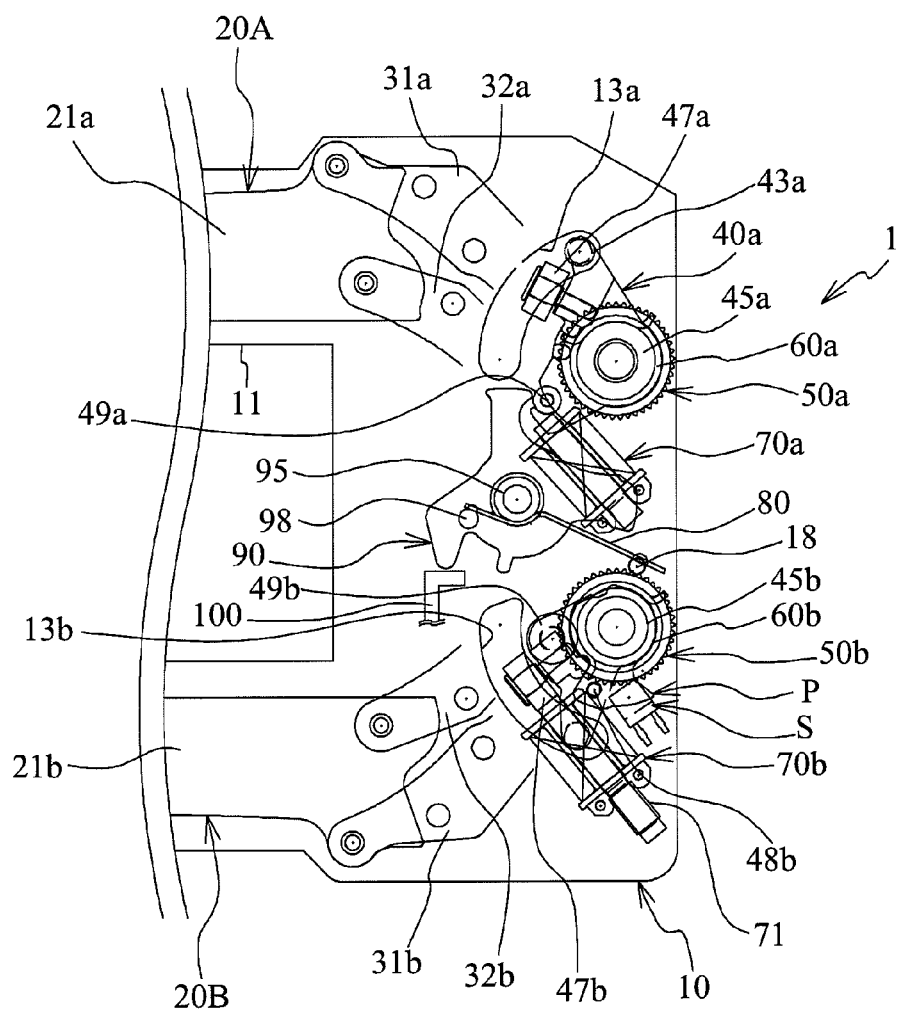
FIG. 9 is an explanatory view of the operation of the focal plane shutter.

The control portion 300 stops the energization of the coil of the self-holding type solenoid 70b, after the coil of the self-holding type solenoid 70b is energized to abut the movable iron piece 47b with the self-holding type solenoid 70b before the set member 90 recedes from the trailing-blades drive lever 40b. After that, the control portion 300 causes the lever 100 to recede from the set member 90. Therefore, the set member 90 swings counterclockwise in accordance with the biasing force of the returning spring 80 to recede from the leading-blades drive lever 40a and the trailing-blades drive lever 40b. Since the energization of the coil of the self-holding type solenoid 70b has already been stopped, the movable iron piece 47b is kept being adsorbed to and held by the yoke of the self-holding type solenoid 70b. In contrast, since the electromagnet 70a is not energized, the leading-blades drive lever 40a swings clockwise in accordance with the biasing force of the bias spring 60a. Therefore, the leading blades 20A and the trailing blades 20B recede from the opening 11 to make the opening 11 in an opened state as illustrated in FIG. 9. The focal plane shutter 1 is brought into a wait state illustrated in the timing chart of FIG. 6. Additionally, the wait state is a non-energized holding state, in the opened state, where neither the electromagnet 70a nor the self-holding type solenoid 70b are energized.

Figure 10:
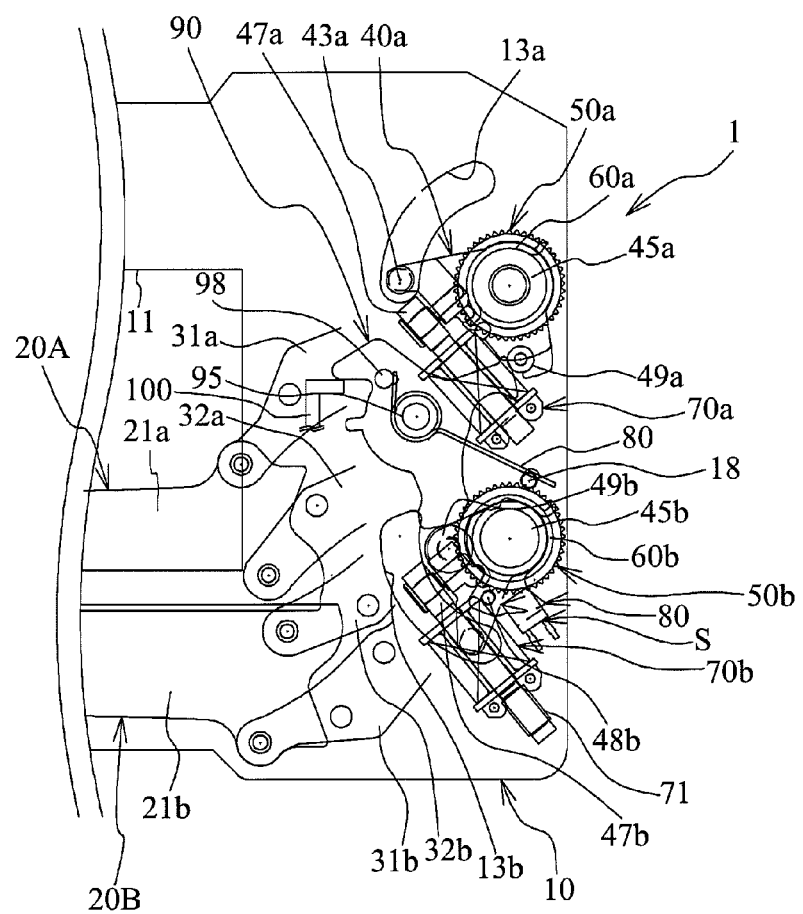
FIG. 10 is an explanatory view of the operation of the focal plane shutter.

Subsequently, in shooting, a release button of the camera is pushed, and then the lever 100 rotates the set member 90 clockwise again to swing the leading-blades drive lever 40a counterclockwise. Therefore, the opening 11 is closed by the leading blades 20A as illustrated in FIG. 10. Further, the energization of the electromagnet 70a starts, whereby the movable iron piece 47a is adsorbed to and held by the electromagnet 70a.

Figure 11:
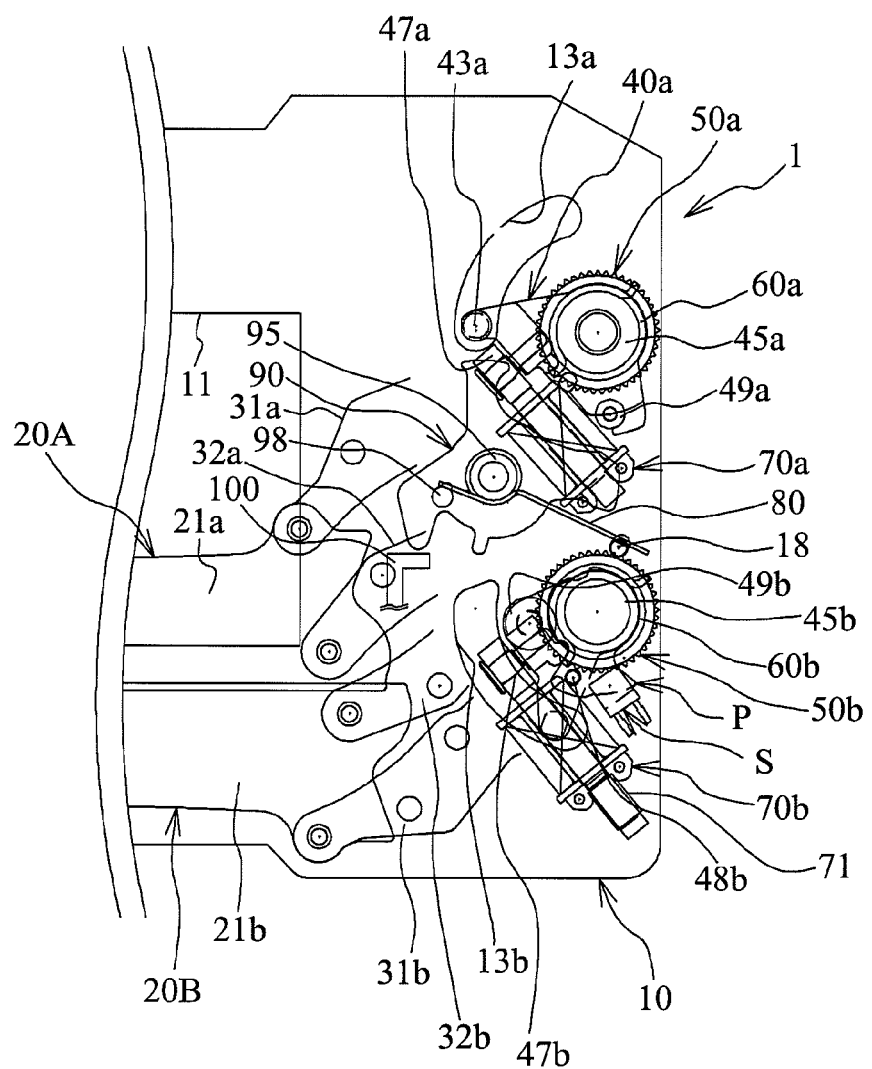
FIG. 11 is an explanatory view of the operation of the focal plane shutter.

After that, the lever 100 recedes from the set member 90 as illustrated in FIG. 11. Since the electromagnet 70a is energized, the state where the leading blades 20A close the opening 11 is maintained for a given period.

Figure 12:
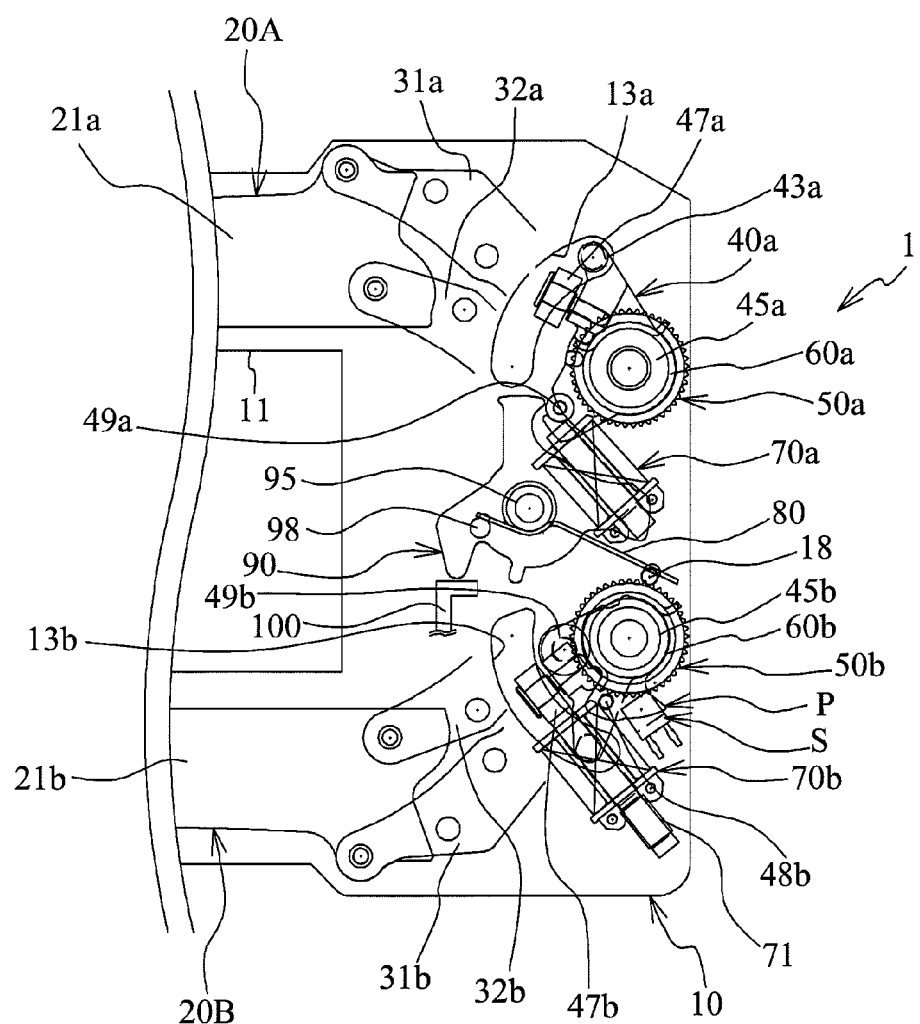
FIG. 12 is an explanatory view of the operation of the focal plane shutter.

Next, the energization of the electromagnet 70a is stopped to swing the leading-blades drive lever 40a clockwise by the biasing force of the bias spring 60a. Therefore, the leading blades 20A recede from the opening 11 as illustrated in FIG. 12. Further, the state where the trailing blades 20B recede from the opening 11 is maintained. Thus, the opening 11 is brought into the opened state. FIG. 12 illustrates the exposure state.

Figure 13:
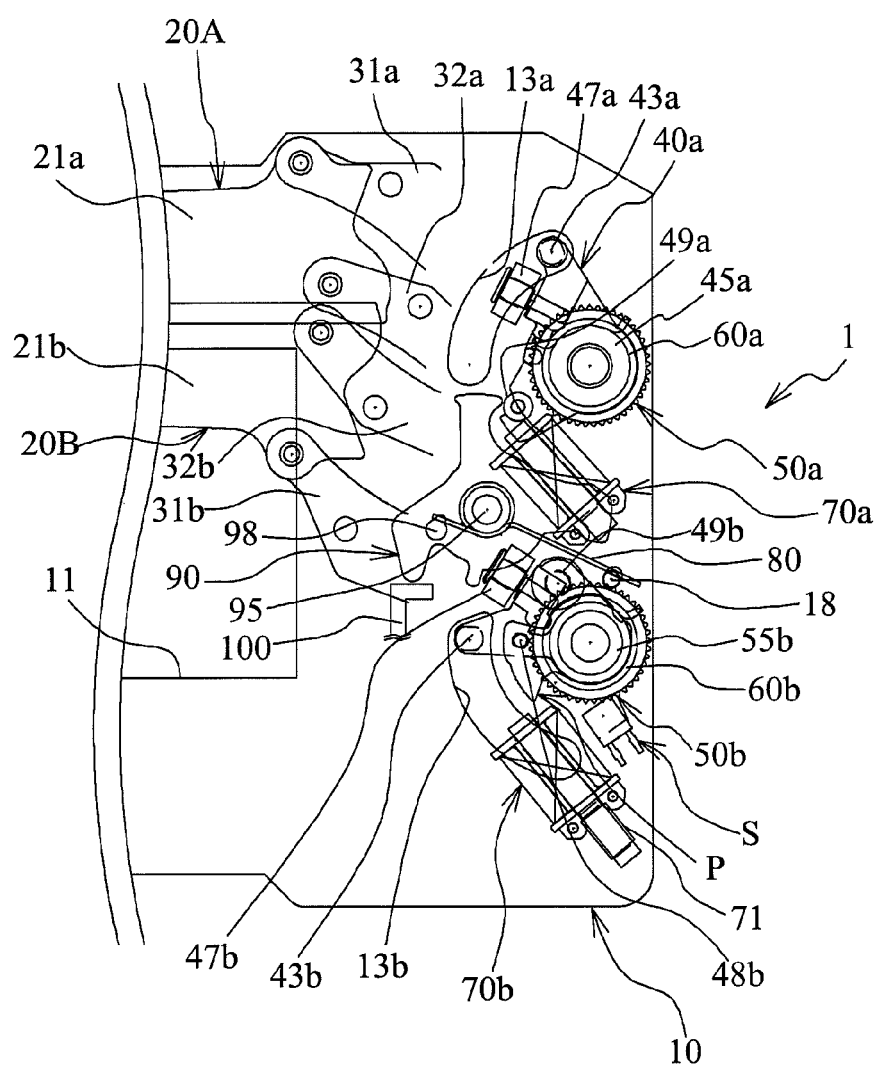
FIG. 13 is an explanatory view of the operation of the focal plane shutter.

After a predetermined period lapses since the release button is pushed, the coil of the self-holding type solenoid 70b is energized to reduce the magnetic attraction force effecting between the self-holding type solenoid 70b and the movable iron piece 47b, and then the trailing-blades drive lever 40b is rotated clockwise by the biasing force of the bias spring 60b. Thus, the trailing blades 20B close the opening 11 as illustrated in FIG. 13. FIG. 13 illustrates the state just after the exposure operation is finished. The state illustrated in FIG. 13 is the same as the states illustrated in FIGS. 1 to 3. In such a way, one cycle of shooting is finished. The energization of the coil of the self-holding type solenoid 70b is stopped after a given period lapses since the energization starts. Additionally, the trailing-blades drive lever 40b swings counterclockwise, and then the thin plate P recedes from the sensor S to change its output value. The fully opened state of the opening 11 as illustrated in FIG. 12 is formed not only in photo shooting but also in movie shooting.

Herein, a description will be given of the reason to reduce the attraction force of the self-holding type solenoid 70b when the movable iron piece 47b abuts the self-holding type solenoid 70b. As mentioned above, the set member 90 swings the trailing-blades drive lever 40b to abuts the movable iron piece 47b with the yoke of the self-holding type solenoid 70b. In cases where the coil of the self-holding type solenoid 70b is not energized before the movable iron piece 47b abuts the self-holding type solenoid 70b, that is, in cases where the magnetic attraction force of the self-holding type solenoid 70b is large, the movable iron piece 47b is attracted to the yoke of the self-holding type solenoid 70b just before the movable iron piece 47b abuts the self-holding type solenoid 70b. This increases the speed of the movable iron piece 47b moving toward the self-holding type solenoid 70b just before the movable iron piece 47b abuts the self-holding type solenoid 70b. On the contrary, in cases where the coil of the self-holding type solenoid 70b is energized before the movable iron piece 47b abuts the self-holding type solenoid 70b, that is, in cases where the magnetic attraction force of the self-holding type solenoid 70b is small, this magnetic attraction force hardly influences the speed of the movable iron piece 47b moving toward the self-holding type solenoid 70b. Thus, the speed of the movable iron piece 47b moving toward the self-holding type solenoid 70b is greater in the cases where the magnetic attraction force is large than in the cases where the magnetic attraction force is small.

Herein, a period from when the energization of the coil of the self-holding type solenoid 70b starts to when the movable iron piece 47b is detached from the yoke tends to be longer in cases where metal powders generated in operating the focal plane shutter are adhered to a portion where the yoke of the self-holding type solenoid 70b and the movable iron piece 47b abut each other than in cases where the metal powders are not adhered thereto. Lubricating oil applied in production acts as adhesion bond with minute impure substances such dusts or the metal powders adhered between the movable iron piece 47b and the yoke. Abutment surfaces constantly press each other in accordance with the attraction force of the permanent magnet 71. It is thus conceivable that the movable iron piece 47b and the yoke of the self-holding type solenoid 70b fix each other for the above reason. Further, the adhesion effect between the movable iron piece 47b and the yoke increases as the speed of the movable iron piece 47b when abutting the yoke increases. This results in variations in the period from when the energization of the coil of the self-holding type solenoid 70b starts to when the movable iron piece 47b is detached from the yoke, in association with the amount of the dusts or the metal powders adhered to the yoke, or in association with the amount of the lubricating oil applied thereto.

Further, the wait state illustrated in FIG. 9 is a state when the power supply of the camera is turned on. That is, in cases where the release button is pushed in shooting after power is applied to the camera in the wait state where neither the electromagnet 70a nor the self-holding type solenoid 70b are energized, the shooting operation mentioned above of the focal plane shutter 1 is also performed. That is, after the lever 100 rotates the set member 90 clockwise again to swing the leading-blades drive lever 40a counterclockwise and the leading blades 20A close the opening 11, the energization of the electromagnet 70a starts, and then the movable iron piece 47a is adsorbed to and held by the electromagnet 70a, and the lever 100 recedes from the set member 90. Next, the energization of the electromagnet 70a is stopped, whereby the leading-blades drive lever 40a causes the leading blades 20A to recede from the opening 11. After a given period lapses from when the release button is pushed, the coil of the self-holding type solenoid 70b is energized to reduce the magnetic attraction force effecting between the self-holding type solenoid 70b and the movable iron piece 47b, and then the trailing-blades drive lever 40b causes the trailing blades 20B to close the opening 11. Therefore, the adhesion effect between the movable iron piece 47b and the yoke may be great when the camera is not operated for a long period. In particular, at a first time shooting after the power is on, the period from when the energization of the coil of the self-holding type solenoid 70b starts to when the movable iron piece 47b is detached from the yoke may be long.

In the present embodiment, the coil is energized to reduce the magnetic attraction force of the yoke when the movable iron piece 47b abuts the self-holding type solenoid 70b. This can suppress the speed of the movable iron piece 47b abutting the yoke. It is therefore possible to reduce the adhesion effect between the movable iron piece 47b and the yoke caused by lubricating oil applied in production and impure substances such as metal powders or dusts attached between the movable iron piece 47b and the yoke. Also, even at a first-time shooting after power is applied to the camera, that is, even when the state where the movable iron piece 47b abuts the self-holding type solenoid 70b is maintained for a long period, the adhesion effect between the movable iron piece 47b and the yoke can be reduced. It is thus possible to suppress the variations in the period from when the energization of the coil of the self-holding type solenoid 70b starts to when the movable iron piece 47b is detached from the yoke. This can result in suppressing the variations in the timing of driving the blades and the variations in the exposure period.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

Although the blade made of a synthetic resin has been described in the present embodiment, the blade having the thin shape may be made of a metal.

In the above embodiment, the leading blades and the trailing blades are each composed of four blades. However, the leading blades and the trailing blades are not limited to these arrangements. The leading blades and the trailing blades may be each composed of two to five blades.

A self-holding type solenoid may be used instead of the electromagnet 70a for driving the leading blades 20A.

The sensor S detects the position of the trailing-blades drive lever 40b in response to the thin plate P interrupting the light from the light emitting element S2 toward the light receiving element S3. However, the sensor S is not limited to this configuration. For example, a sensor may be provided at a position such that the blade 21b interrupts the light emitted from the light emitting element S2 toward the light receiving element S3 in accordance with the traveling of the trailing blades 20B.

In the above embodiment, the energization of the self-holding type solenoid 70b reduces the magnetic attraction force thereof. In cases where the magnetic attraction force of the self-holding type solenoid 70b in the energized state is smaller than that of the self-holding type solenoid 70b in the non-energized state, any magnitude of the magnetic attraction force of the self-holding type solenoid 70b in the energized state may be employed. Thus, the self-holding type solenoid 70b may be energized such that its magnetic attraction force is substantially zero, or such that its magnetic attraction force is slightly smaller in the energized state than in the non-energized state.

Finally, several aspects of the present invention are summarized as follows.

According to an aspect of the present invention, there is provided a focal plane shutter including: a board including an opening; blades capable of opening and closing the opening; a drive lever swingably supported, holding a movable iron piece and driving the blades; a self-holding type solenoid capable of adsorbing to the movable iron piece by a given attraction force in a non-energized state, and reducing the given attraction force in an energized state; a biasing member biasing the drive lever to move the drive lever away from the self-holding type solenoid; and a set member moving the drive lever to abut the drive lever with the self-holding type solenoid, wherein the self-holding type solenoid is energized to reduce the given attraction force when the drive lever is swung by the set member to abut the movable iron piece with the self-holding type solenoid.

This can suppress variations in the period from when an energization of a coil of the self-holding type solenoid starts from when the movable iron piece recedes from the self-holding type solenoid. It is thus possible to suppress variations in the timing of driving blades.

According to another aspect of the present invention, there is provided an optical apparatus including the above focal plane shutter.

What is claimed is:

1. A focal plane shutter, comprising:
a board including an opening;
blades capable of opening and closing the opening;
a drive lever swingably supported, holding a movable iron piece and driving the blades;
a self-holding type solenoid capable of adsorbing to the movable iron piece by a given attraction force in a non-energized state, and reducing the given attraction force in an energized state,
wherein:
the self-holding type solenoid includes: a yoke; a coil wound around the yoke, and a permanent magnet secured to the yoke such that the yoke has the given attraction force,
the given attraction force is ensured in the non-energized state where the coil is not energized, and
the given attraction force is reduced in the energized state where the coil is energized;
a biasing member biasing the drive lever to move the drive lever away from the self-holding type solenoid; and
a set member moving the drive lever to abut the drive lever with the self-holding type solenoid,
wherein the self-holding type solenoid is energized to reduce the given attraction force before the movable iron piece abuts the self-holding type solenoid, and the drive lever is swung by the set member to abut the movable iron piece with the self-holding type solenoid, while the self-holding type solenoid is energized to reduce the given attraction force.

2. The focal plane shutter of claim 1, wherein an energization of the self-holding type solenoid starts before the movable iron piece abuts the self-holding type solenoid.

3. The focal plane shutter of claim 1, wherein an energization of the self-holding type solenoid is stopped after the set member sets the drive lever and before the set member recedes from the drive lever.

4. The focal plane shutter of claim 1, further comprising a sensor detecting a position of the drive lever,
wherein a timing when an energization of the self-holding type solenoid is started is controlled in response to an output from the sensor.

5. The focal plane shutter of claim 1, wherein
the blades include leading blades and trailing blades, and
the drive lever moves the trailing blades.

6. An optical apparatus, comprising
a focal plane shutter including:
a board including an opening;
blades capable of opening and closing the opening;
a drive lever swingably supported, holding a movable iron piece and driving the blades;
a self-holding type solenoid capable of adsorbing to the movable iron piece by a given attraction force in a non-energized state, and reducing the given attraction force in an energized state,
wherein:
the self-holding type solenoid includes: a yoke; a coil wound around the yoke, and a permanent magnet secured to the yoke such that the yoke has the given attraction force,
the given attraction force is ensured in the non-energized state where the coil is not energized, and
the given attraction force is reduced in the energized state where the coil is energized;
a biasing member biasing the drive lever to move the drive lever away from the self-holding type solenoid; and
a set member moving the drive lever to abut the drive lever with the self-holding type solenoid,
wherein the self-holding type solenoid is energized to reduce the given attraction force before the movable iron piece abuts the self-holding type solenoid, and the drive lever is swung by the set member to abut the movable iron piece with the self-holding type solenoid, while the self-holding type solenoid is energized to reduce the given attraction force.

* * * * *